(12) United States Patent
Skurniak

(10) Patent No.: US 11,587,494 B2
(45) Date of Patent: Feb. 21, 2023

(54) METHOD AND ELECTRONIC DEVICE FOR CONTROLLING DISPLAY DIRECTION OF CONTENT

(71) Applicant: Samsung Electronics Co., Ltd., Suwon-si (KR)

(72) Inventor: Filip Skurniak, Warsaw (PL)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/424,062

(22) PCT Filed: Jan. 13, 2020

(86) PCT No.: PCT/KR2020/000550
§ 371 (c)(1),
(2) Date: Jul. 19, 2021

(87) PCT Pub. No.: WO2020/153641
PCT Pub. Date: Jul. 30, 2020

(65) Prior Publication Data
US 2022/0130316 A1   Apr. 28, 2022

(30) Foreign Application Priority Data
Jan. 22, 2019 (KR) .......... 10-2019-0008058

(51) Int. Cl.
*G09G 3/20* (2006.01)
*H04M 1/72454* (2021.01)

(52) U.S. Cl.
CPC ... *G09G 3/2092* (2013.01); *G09G 2340/0471* (2013.01); *G09G 2340/0478* (2013.01); *G09G 2354/00* (2013.01); *H04M 1/72454* (2021.01)

(58) Field of Classification Search
None
See application file for complete search history.

(56) References Cited

U.S. PATENT DOCUMENTS

| | | |
|---|---|---|
| 6,056,175 A | 5/2000 | Mieglitz et al. |
| 6,192,258 B1 | 2/2001 | Kamada et al. |
| 6,965,413 B2 | 11/2005 | Wada |
| 7,120,473 B1 | 10/2006 | Hawkins et al. |
| 7,289,102 B2 | 10/2007 | Hinckley et al. |
| 7,414,834 B2 | 8/2008 | Ukonaho et al. |
| 7,469,381 B2 | 12/2008 | Ording |
| 7,479,949 B2 | 1/2009 | Jobs et al. |
| 7,512,426 B2 | 3/2009 | Maatta et al. |
| 7,536,034 B2 | 5/2009 | Rhoads et al. |

(Continued)

FOREIGN PATENT DOCUMENTS

| | | |
|---|---|---|
| CN | 2717138 Y | 8/2005 |
| CN | 1871838 A | 11/2006 |

(Continued)

*Primary Examiner* — Yi Wang
(74) *Attorney, Agent, or Firm* — Jefferson IP Law, LLP

(57) ABSTRACT

The disclosure relates to a method for controlling a display direction of an electronic device. A method operating the electronic device includes displaying content on a screen of the electronic device, determining a display direction of content on the basis of a user profile upon detecting a tilt change of the electronic device by using a sensor, and displaying the content on the screen depending on the determined display direction.

11 Claims, 13 Drawing Sheets

(56) References Cited

U.S. PATENT DOCUMENTS

| | | |
|---|---|---|
| 7,595,904 B2 | 9/2009 | Lapstun et al. |
| 7,607,111 B2 | 10/2009 | Vaananen et al. |
| 7,705,833 B2 | 4/2010 | Kim |
| 7,725,988 B2 | 6/2010 | Kim et al. |
| 7,760,905 B2 | 7/2010 | Rhoads et al. |
| 7,870,496 B1 | 1/2011 | Sherwani |
| 7,978,182 B2 | 7/2011 | Ording et al. |
| 8,155,692 B1 | 4/2012 | Roka |
| 8,217,904 B2 | 7/2012 | Kim |
| 8,290,480 B2 | 10/2012 | Abramson et al. |
| 8,550,903 B2 | 10/2013 | Lyons et al. |
| 8,639,296 B2 | 1/2014 | Ahn et al. |
| 8,917,632 B2 | 12/2014 | Zhou et al. |
| 9,348,431 B2 | 5/2016 | Hwang |
| 9,785,202 B2 | 10/2017 | Shin et al. |
| 2002/0058531 A1 | 5/2002 | Terasaki et al. |
| 2004/0192398 A1 | 9/2004 | Zhu |
| 2005/0034084 A1 | 2/2005 | Ohtsuki et al. |
| 2005/0124392 A1 | 6/2005 | Jeong |
| 2005/0143136 A1 | 6/2005 | Lev et al. |
| 2005/0243783 A1 | 11/2005 | Lee et al. |
| 2005/0288075 A1 | 12/2005 | Geernaert |
| 2006/0077211 A1 | 4/2006 | Zhou |
| 2006/0246945 A1 | 11/2006 | Lee |
| 2007/0265031 A1 | 11/2007 | Koizumi et al. |
| 2007/0281675 A1 | 12/2007 | Pletikosa et al. |
| 2007/0293283 A1 | 12/2007 | Inubushi et al. |
| 2008/0051162 A1 | 2/2008 | Kim et al. |
| 2008/0068451 A1 | 3/2008 | Hyatt |
| 2009/0011798 A1 | 1/2009 | Yamada |
| 2009/0051830 A1 | 2/2009 | Matsushita et al. |
| 2009/0058882 A1 | 3/2009 | Adachi et al. |
| 2009/0117953 A1 | 5/2009 | Oh |
| 2009/0117955 A1 | 5/2009 | Lo |
| 2009/0259968 A1 | 10/2009 | Hsieh et al. |
| 2009/0280860 A1 | 11/2009 | Dahlke |
| 2009/0297062 A1 | 12/2009 | Molne et al. |
| 2010/0026720 A1 | 2/2010 | Hotta et al. |
| 2010/0083167 A1 | 4/2010 | Kikuchi et al. |
| 2010/0240425 A1 | 9/2010 | Madsen et al. |
| 2010/0265269 A1* | 10/2010 | Matsuda ............... G09G 3/2092 345/650 |
| 2010/0285844 A1 | 11/2010 | Hosoi et al. |
| 2011/0025625 A1 | 2/2011 | Hirako |
| 2011/0205248 A1 | 8/2011 | Honda et al. |
| 2011/0221667 A1 | 9/2011 | Lee |
| 2011/0221684 A1 | 9/2011 | Rydenhag |
| 2011/0294543 A1 | 12/2011 | Lapstun et al. |
| 2012/0062564 A1 | 3/2012 | Miyashita et al. |
| 2012/0084699 A1 | 4/2012 | Sirpal et al. |
| 2012/0214546 A1 | 8/2012 | Osaka |
| 2012/0256959 A1 | 10/2012 | Ye et al. |
| 2012/0259707 A1 | 10/2012 | Thielke et al. |
| 2012/0327122 A1 | 12/2012 | Imamura |
| 2013/0072120 A1 | 3/2013 | Wu |
| 2013/0084919 A1 | 4/2013 | Glynn |
| 2013/0120295 A1 | 5/2013 | Kim et al. |
| 2013/0120447 A1 | 5/2013 | Kim et al. |
| 2013/0222431 A1 | 8/2013 | Joo et al. |
| 2013/0234927 A1 | 9/2013 | Roh |
| 2013/0293731 A1 | 11/2013 | Kim |
| 2014/0009498 A1* | 1/2014 | Bismilla ............... G09G 5/363 345/650 |
| 2014/0062860 A1 | 3/2014 | Lee et al. |
| 2014/0160078 A1 | 6/2014 | Seo et al. |
| 2014/0213324 A1 | 7/2014 | Tan et al. |
| 2014/0310643 A1 | 10/2014 | Karmanenko et al. |
| 2014/0340334 A1 | 11/2014 | Cho |
| 2015/0116363 A1 | 4/2015 | Monte et al. |
| 2016/0021238 A1 | 1/2016 | Abramson et al. |
| 2016/0077592 A1 | 3/2016 | Bhesania et al. |
| 2017/0109011 A1 | 4/2017 | Jiang |
| 2018/0039408 A1 | 2/2018 | Cheong et al. |

FOREIGN PATENT DOCUMENTS

| | | |
|---|---|---|
| CN | 201213278 Y | 3/2009 |
| CN | 101437095 A | 5/2009 |
| CN | 101539833 A | 9/2009 |
| CN | 101561743 A | 10/2009 |
| CN | 101599267 A | 12/2009 |
| CN | 201409149 Y | 2/2010 |
| CN | 101873371 A | 10/2010 |
| CN | 102314179 A | 1/2012 |
| CN | 102420898 A | 4/2012 |
| CN | 102594990 A | 7/2012 |
| CN | 102624978 A | 8/2012 |
| CN | 203327079 U | 12/2013 |
| CN | 103595836 A | 2/2014 |
| CN | 103995788 A | 8/2014 |
| CN | 104461316 A | 3/2015 |
| DE | 10242378 A1 | 3/2004 |
| EP | 1312999 A2 | 5/2003 |
| JP | 2005-130132 A | 5/2005 |
| JP | 2005-136457 A | 5/2005 |
| JP | 2005-156627 A | 6/2005 |
| JP | 2005-167455 A | 6/2005 |
| JP | 2005-198062 A | 7/2005 |
| JP | 2006-72872 A | 3/2006 |
| JP | 2007-108326 A | 4/2007 |
| JP | 2008-131616 A | 4/2007 |
| JP | 2010-263433 A | 11/2010 |
| JP | 2011-203860 A | 10/2011 |
| JP | 2014-154055 A | 8/2014 |
| KR | 10-0704120 B1 | 4/2007 |
| KR | 10-2008-0035709 A | 4/2008 |
| KR | 10-2011-0101585 A | 9/2011 |
| KR | 10-2013-0102848 A | 9/2013 |
| KR | 10-2014-0121075 A | 10/2014 |
| KR | 10-2014-0135029 A | 11/2014 |
| KR | 10-2017-0057326 A | 5/2017 |
| KR | 10-2018-0015533 A | 2/2018 |
| WO | 2006-073020 A1 | 7/2006 |
| WO | 2007-077649 A1 | 7/2007 |
| WO | 2014-000123 A1 | 1/2014 |

* cited by examiner

| Application | Preference of display direction |
|---|---|
| | Landscape (horizontal) ------------ Portrait (vertical) |
| A | 0 —O————————————— 1<br>    0.2 |
| B | 0 ————————————O— 1<br>                    0.8 |

FIG.8

METHOD AND ELECTRONIC DEVICE FOR CONTROLLING DISPLAY DIRECTION OF CONTENT

TECHNICAL FIELD

The disclosure relates in general to an electronic device, and in particular to a method and electronic device for controlling a display direction of content in the electronic device.

BACKGROUND ART

A screen rotation is an operation for displaying various types of content on a display of portable electronic devices. A user may rotate a smartphone to change a direction of the displayed content between two display modes, i.e., a horizontal mode and a vertical mode. Methods currently in use are configured to operate only when the user is in a sitting or standing position, which makes it easy to distinguish a relative position between a device and the ground. Examples of the method include a technique which calculates an appropriate timing for changing a screen mode by using an accelerometer, a technique which determines whether to change the screen mode by detecting a user's face position with a camera, or a technique which determines whether to change the screen mode by using a touch sensor.

DISCLOSURE OF INVENTION

Technical Problem

Based on the above discussion, the disclosure provides a method and electronic device for controlling a display direction of content in the electronic device.

In addition, the disclosure provides a method and electronic device for determining a display direction of content in the electronic device on the basis of on a user profile.

In addition, the disclosure provides a method and electronic device for determining whether to modify a determined display direction, based on an input for the electronic device.

Solution to Problem

According to various embodiments of the disclosure, a method of operating an electronic device may include displaying content on a screen of the electronic device, determining a display direction of content on the basis of a user profile upon detecting a tilt change of the electronic device by using a sensor, and displaying the content on the screen depending on the determined display direction.

According to various embodiments of the disclosure, an electronic device may include a screen, a sensor, and at least one processor electrically coupled to the screen and the sensor. The at least one processor may be configured to display content on the screen, determine a display direction of content on the basis of a user profile upon detecting a tilt change of the electronic device by using the sensor, and display the content on the screen depending on the determined display direction.

Advantageous Effects of Invention

A method and electronic device thereof according to various embodiments of the disclosure can determine a change of a display direction of content on the basis of usage information on the electronic device, thereby preventing a user from unintentionally changing the display direction.

In addition, a method and electronic device thereof according to various embodiments of the disclosure can control a display direction on the basis of user's usage information on the electronic device, thereby providing a change of a personalized display direction.

In addition, a method and electronic device thereof according to various embodiments of the disclosure can control a display direction on the basis of usage information stored in the electronic device, thereby reducing power consumed by a sensor to control the display direction.

Advantages acquired in the disclosure are not limited to the aforementioned advantages. Other advantages not mentioned herein can be clearly understood by those skilled in the art to which the disclosure pertains from the following descriptions.

BRIEF DESCRIPTION OF DRAWINGS

FIG. 8 illustrates an example in which a rotation determination unit uses a display direction preference of a user;

BEST MODE FOR CARRYING OUT THE INVENTION

Terms used in the disclosure are for the purpose of describing particular embodiments only and are not intended to limit other embodiments. A singular expression may include a plural expression unless there is a contextually distinctive difference. Unless otherwise defined, all terms (including technical and scientific terms) used herein have the same meaning as commonly understood by those ordinarily skilled in the art disclosed in the disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the disclosure should not be interpreted to exclude the embodiments of the disclosure.

A hardware-based approach is described for example in the various embodiments of the disclosure described hereinafter. However, since the various embodiments of the disclosure include a technique in which hardware and software are both used, a software-based approach is not excluded in the embodiments of the disclosure.

The disclosure described below relates to a method for controlling a display direction of content, and an electronic device thereof. Specifically, the disclosure describes a technique for controlling a direction in which the content is displayed in the electronic device according to user's application usage information.

In the following description, terms which refer to usage information (e.g., a user profile) of a device, an algorithm for determining whether to change a display direction of content, a component of the device, and so on are used for convenience of explanation. Therefore, the disclosure is not limited to the terms to be described below, and other terms having equivalent technical meanings may be used.

In particular, the term 'display direction' or 'display mode' refers to a mode in which content is displayed on a screen of an electronic device throughout the disclosure, and may include a mode (e.g., a horizontal mode, a landscape mode, a horizontal direction) in which the content is displayed such that an upper end of the content is located at a side portion of the electronic device and a mode (e.g., a vertical mode, a portrait mode, a vertical direction) in which the content is displayed such that the upper end of the content is located at an upper end of the electronic device or located at a lower end of the electronic device.

Figure 1:
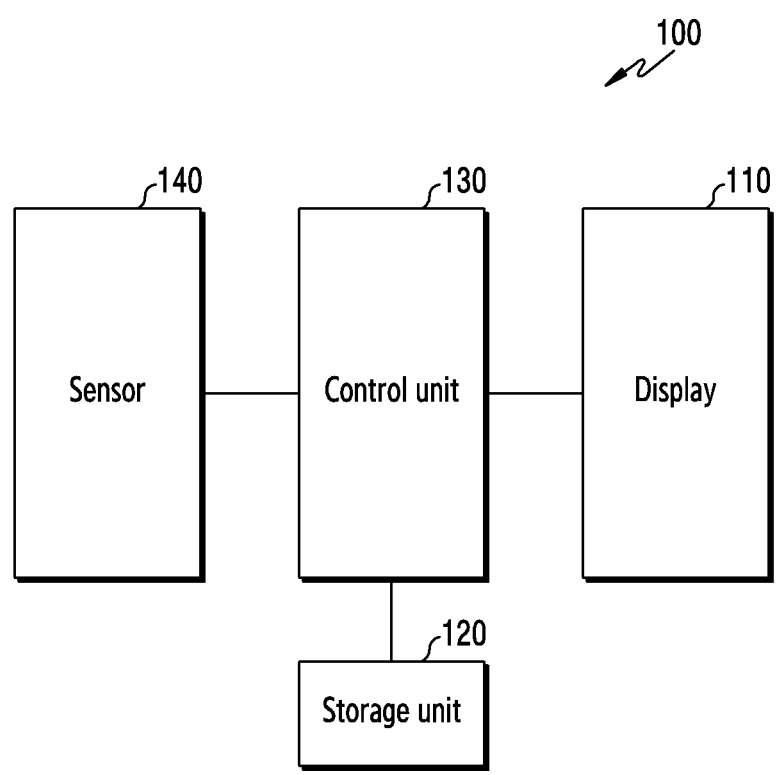
FIG. 1 illustrates a structure of an electronic device according to various embodiments of the disclosure.

FIG. 1 illustrates a structure of an electronic device according to various embodiments of the disclosure. The structure illustrated in FIG. 1 may be understood as a structure of an electronic device 100. The electronic device 100 is a computing or processing device used by a user. For example, the electronic device 100 may be implemented with any one of a mobile phone, a smartphone, a Personal Digital Assistant (PDA), and a tablet computer. Hereinafter, the term ' . . . unit', ' . . . device', or the like implies a unit of processing at least one function or operation, and may be implemented in hardware or software or in combination of the hardware and the software.

Referring to FIG. 1, the electronic device includes a display 110, a storage unit 120, a control unit 130, and a sensor 140.

The display 110 performs functions for outputting information in the form of numbers, characters, images, and graphics. To this end, the display 110 may include at least one hardware module for outputs. For example, the hardware module may include at least one of a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), and a Flexible LED (FLED). That is, the display 110 may display a screen corresponding to data received from the controller 130. In addition, according to various embodiments, the display 110 may display content in a display direction determined by the controller 130. According to various embodiments, the display 110 may be referred to as terms such as a 'display unit' and a 'screen'.

The storage unit 120 may store data such as a basic program, application program, configuration information, or the like for an operation of the electronic device. The storage unit 120 may be constructed of a volatile memory, a non-volatile memory, or a combination of the volatile memory and the non-volatile memory. In addition, the storage unit 450 may provide the stored data at the request of the control unit 130. In addition, according to various embodiments, the storage unit 120 may store at least one application and a user profile used to control a display direction of the display 110.

The control unit 130 controls overall operations of the electronic device. For example, the control unit 130 writes and reads data in the storage unit 120, and executes instructions stored in the storage unit 120. In addition, the control unit 130 may process an input or information detected through the sensor 140, and may display various screens through the display 110. To this end, the control unit 130 may include at least one processor. For example, the control unit 130 may be implemented with at least one microprocessor and/or at least one microcontroller. In addition, according to various embodiments, the controller 130 may determine whether to change the display direction of content, by using the user profile stored in the storage unit 120. In addition, according to various embodiments, the controller 130 may determine whether to modify the determined display direction, based on an input detected through the sensor 140.

The sensor 140 detects at least one of internal information of the electronic device, information on a surrounding environment of the electronic device, and information input by the user. For example, the sensor 140 may include at least one of an accelerometer, a gyroscope, an optical sensor (e.g., a camera), and a touch sensor. According to various embodiments, when the sensor 140 includes the accelerometer, the gyroscope, or a combination thereof, the sensor 140 may detect a tilt change of the electronic device. Alternatively, when the sensor 140 includes the optical sensor such as the camera, the sensor 140 may detect a face position of a user who uses the electronic device.

Although not shown in FIG. 1, the electronic device according to various embodiments may further include a communication unit. The communication unit may provide an interface for communication with other systems or devices. In this case, the electronic device may receive the user profile including device usage information of various users from another device in order to control the display direction of content.

Figure 2:
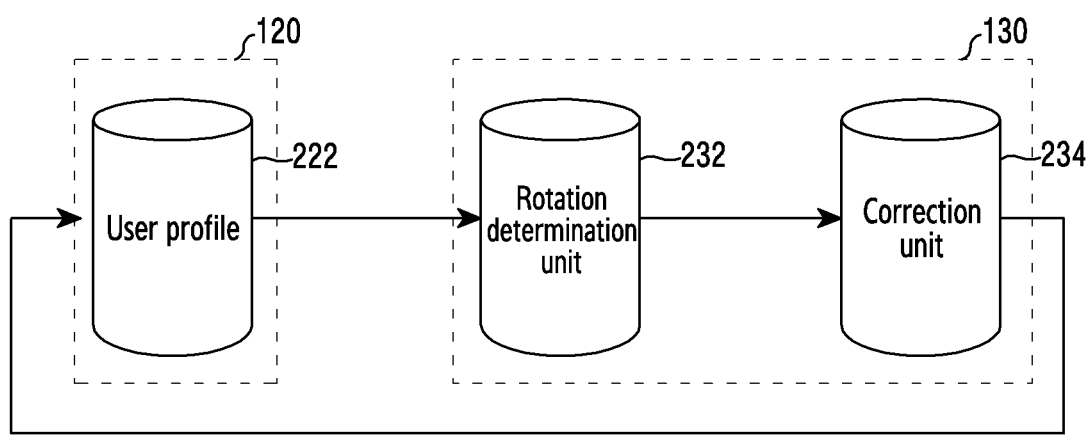
FIG. 2 illustrates a functional structure of a control unit and storage unit in an electronic device according to various embodiments of the disclosure.

FIG. 2 illustrates a functional structure of a control unit and storage unit in an electronic device according to various embodiments of the disclosure. The structure illustrated in FIG. 2 may be understood as a structure of the storage unit 120 and control unit 130. Hereinafter, the term ' . . . unit', ' . . . device', or the like implies a unit of processing at least one function or operation, and may be implemented in hardware or software or in combination of the hardware and the software.

Referring to FIG. 2, the storage unit 120 includes a user profile 222. The user profile 222 may store information used by the electronic device to control a display direction of content. According to various embodiments, the user profile 222 may store all events related to a user's behavior, that is, a usage pattern for the electronic device. Data stored in the user profile may be used to create a model used by the electronic device to determine whether to change the display direction. The control unit 130 includes a rotation determination unit 232 and a correction unit 234. The rotation determination unit 232 determines whether to change the display direction of content, by using the information stored in the user profile 222. According to various embodiments, when a tilt change of the electronic device or the like is detected by the sensor 140, the rotation determination unit 232 determines whether to change the display direction on the basis of the user profile 222. In this case, the rotation determiner 232 may utilize a machine learning algorithm such as deep learning or the like to predict whether the display direction shall be changed or maintained.

The correction unit 234 determines whether to modify the display direction determined by the rotation determination unit 232. According to various embodiments, the correction unit 234 monitors a user's input for the display direction determined by the rotation determination unit 232, and the monitoring may be performed based on data from the sensor 140. In this case, upon detecting an input for changing to a display direction different from the determined display direction, the correction unit 234 determines to modify the display direction.

Figure 3:
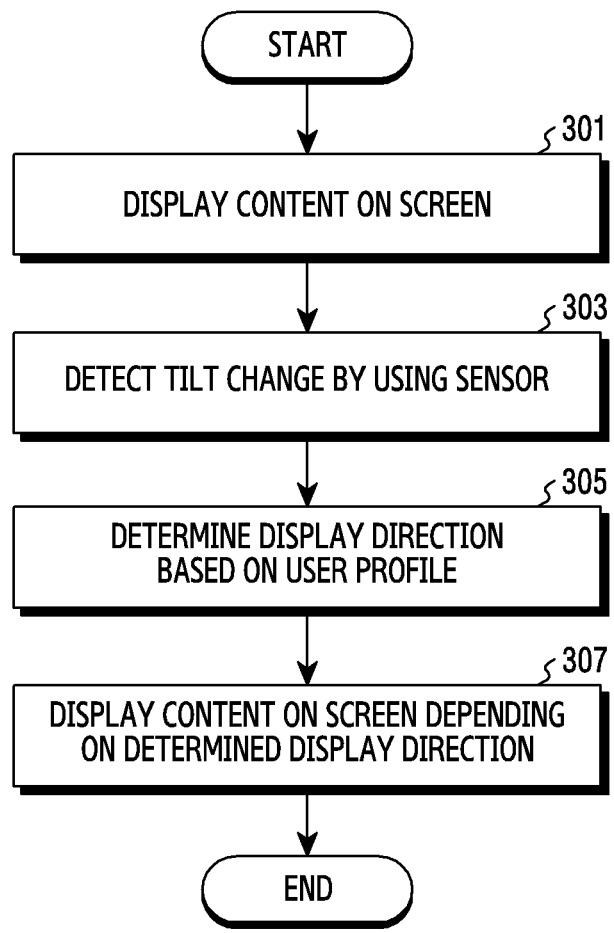
FIG. 3 is a flowchart for determining a display direction of content in an electronic device according to various embodiments of the disclosure.

FIG. 3 is a flowchart for determining a display direction of content in an electronic device according to various embodiments of the disclosure. An operation of the electronic device 100 is illustrated in FIG. 3.

Referring to FIG. 3, in step 301, the electronic device displays the content on a screen. The electronic device may execute various applications stored in the electronic device and display a variety of content provided by the applications on the screen. According to various embodiments, the content that can be displayed on the screen may include various types of media such as documents, videos, images, or the like. In this case, the electronic device may display the content in a display direction determined based on a result detected by sensors.

In step 303, the electronic device detects a tilt change by using the sensor. While displaying the content depending on the determined display direction, the electronic device may detect the tilt change of the electronic device through the sensor. According to various embodiments, the electronic device may detect the tilt change by using an accelerometer or a gyroscope, or may detect the tilt change by using a combination thereof.

In step 305, the electronic device determines the display direction on the basis of a user profile. More specifically, when the electronic device detects the tilt change through the sensor, the electronic device may determine the display direction by using a model trained based on data of the user profile. The electronic device may determine whether to change to a direction different from a current display direction, by applying an algorithm which determines a display direction with respect to a sensor detection result and a current usage state (e.g., an application to be executed, content, etc.).

In step 307, the electronic device displays the content on the screen depending on the determined display direction. More specifically, when it is determined to change the display direction by an algorithm for determining the display direction, the electronic device may display the content on the screen depending on the changed display direction. Alternatively, when it is determined to maintain the display direction, the electronic device may display the content while maintaining the display direction. According to various embodiments, until a next tilt change is detected, the electronic device may display a variety of content on the screen depending on the determined display direction.

Figure 4:
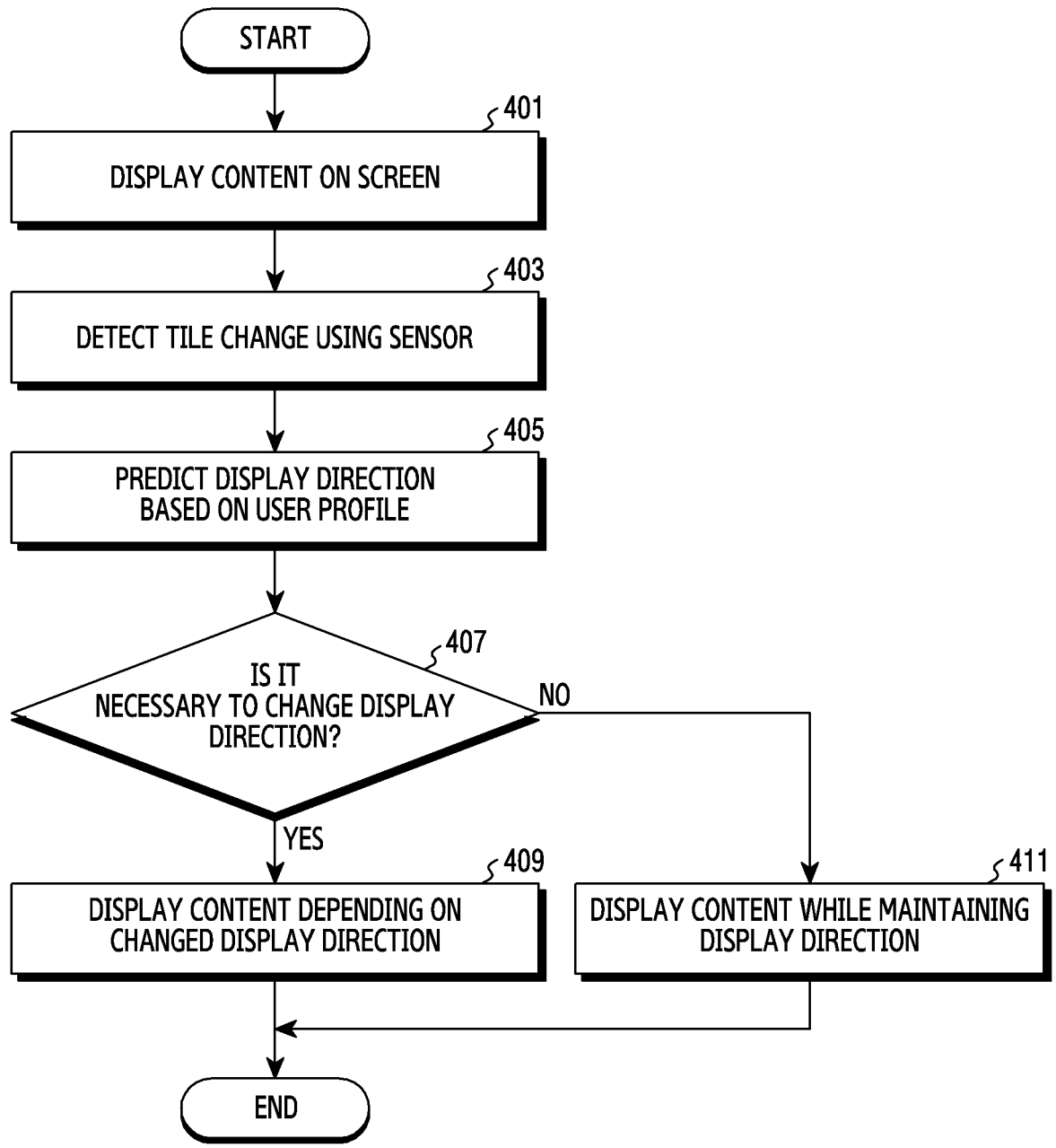
FIG. 4 is a detailed flowchart for determining a display direction of content in an electronic device according to various embodiments of the disclosure.

FIG. 4 is a detailed flowchart for determining a display direction of content in an electronic device according to various embodiments of the disclosure. An operation of the electronic device 100 is illustrated in FIG. 4.

Referring to FIG. 4, in step 401, the electronic device displays the content on a screen. According to various embodiments, the content that can be displayed on the screen may include various types of media such as documents, videos, images, or the like. In this case, the electronic device may display the content depending on a display direction determined based on a result detected by sensors. For example, when a user rotates the electronic device such that a display direction of video content is a horizontal direction, the electronic device may detect that the electronic device is rotated in the horizontal direction through the sensor, and may determine to display the video content on the screen in a horizontal mode. According to various embodiments, usage information related to a display mode in which content is displayed on the electronic device may be recorded in the aforementioned user profile.

In step 403, the electronic device detects a tilt change by using the sensor. According to various embodiments, the electronic device may detect the tilt change by using an accelerometer or a gyroscope, or a combination thereof. For example, the electronic device may detect the tilt change of the electronic device by measuring acceleration of the electronic device and gravity applied to the electronic device through the accelerometer. In another example, the electronic device may detect the tilt change of the electronic device by measuring an angle change of the electronic device through the gyroscope. The tilt change may occur by various causes such as a change in a posture of a user who holds the electronic device, a rotation applied to the electronic device with intent to change the display direction, an input applied to the electronic device during moving the electronic device to a place in a location different from a current location.

In step 405, the electronic device predicts the display direction on the basis of the user profile. According to an embodiment, the electronic device may obtain a sensor detection result and usage information (e.g., an application to be executed, a content type, a display direction, etc.) of a timing at which a tilt change occurs, and may determine the display direction of content by applying an algorithm for determining the display direction. According to another embodiment, the electronic device may determine the display direction by using a sensor detection result and usage information of a specific period of time from a timing at which the tilt change occurs. For example, when video content is reproduced in a state where the display mode is set to the horizontal mode and when the tilt change detected by the sensor is less than a threshold, the electronic device may determine the display direction of content to the horizontal direction. In another example, when the video content is reproduced in a state where the display mode is set to the horizontal mode and the detected tilt change is greater than or equal to the threshold, the electronic device may determine the display direction of content to a vertical direction.

In step 407, the electronic device determines whether it is necessary to change the display direction. According to various embodiments, when the electronic device is displaying the content depending on a pre-set display direction, the electronic device may determine whether a display direction predicted by a model based on the user profile is different from the pre-set display direction. Herein, the pre-set display direction implies a display direction determined based on a sensor in an initial operation or a display direction determined based on a model before the tilt change is detected. For example, when the pre-set display direction is the horizontal direction and the predicted display direction is the vertical direction, the electronic device may determine to change the display direction. Alternatively, when both the pre-set display direction and the predicted display direction are the horizontal directions, the electronic device may determine to maintain the display direction. The above description can also be equally applied when the display direction is predetermined to the vertical direction.

If it is determined that the change in the display direction is necessary, in operation 409, the electronic device displays the content depending on the changed display direction. For example, if the electronic device determines to change the display direction to the vertical direction, the electronic device may display the video content in a vertical mode. In this case, until a next tilt change is detected, the electronic device may display the video content on the screen in the vertical mode, or may switch the displayed content to display different content such as a document and an image. The above description can also be equally applied to a case where the electronic device determines to change the display direction to the horizontal direction.

If it is determined that the change in the display direction is not necessary, in operation 411, the electronic device displays the content on the screen while maintaining the display direction. For example, if the electronic device determines to maintain the display direction to the horizontal direction, the electronic device may display the video content in the horizontal mode. In this case, until the next tilt change of the electronic device is detected, the electronic device may display the video content on the screen in the horizontal mode or may switch the displayed content to display different content. The above description can also be equally applied to a case where the electronic device determines to maintain the display direction to the vertical direction.

If the display direction of the electronic device determined according to the embodiment described in FIG. 4 does not reflect the user's intention, the display direction may be changed again based on the user's input. In addition, data related to the modified display direction may be added to the user profile and thus may be used for learning to determine the display direction. Hereinafter, an embodiment for determining whether to modify the display direction will be described with reference to FIG. 5.

Figure 5:
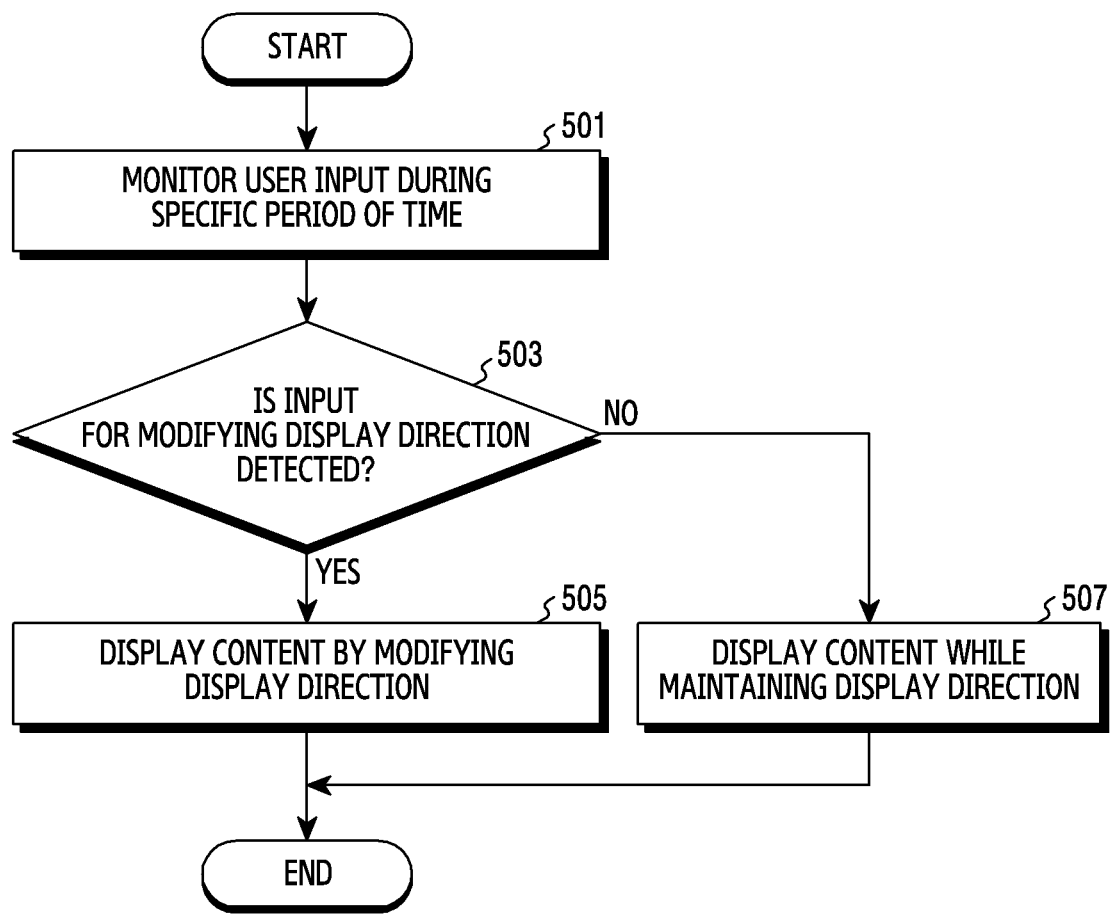
FIG. 5 is a flowchart for determining whether to modify a display direction of content in an electronic device according to various embodiments.

FIG. 5 is a flowchart for determining whether to modify a display direction of content in an electronic device according to various embodiments. An operation of the electronic device 100 is illustrated in FIG. 5.

Referring to FIG. 5, in step 501, the electronic device monitors a user input for a specific period of time. More specifically, after determining a display direction by using a model trained based on a user profile, the electronic device may monitor whether the user input occurs in response to the determined display direction. In this case, the electronic device may monitor whether the user input is detected by using a sensor. According to various embodiments, a monitoring time may be pre-set when the electronic device is initially driven, or may be adaptively changed by the electronic device.

In step 503, the electronic device determines whether an input for modifying the display direction is detected. More specifically, after the content is configured to be displayed depending on the determined display direction, the electronic device may determine whether a subsequent input which is input within a specific period of time is for modifying the display direction. For example, the input for modifying the display direction may be detected by a sensor, such as an accelerometer or a gyroscope, which detects a title change of the electronic device. In another example, an input for maintaining the display direction may be detected by a touch sensor as a touch input for selecting an icon, content, or the like displayed on a screen without causing the tilt change of the electronic device. In another example, the input for maintaining the display direction may be detected by the touch sensor while maintaining a tilt change value smaller than a preset value.

Upon detecting the input for changing the display direction, in operation 505, the electronic device displays the content depending on the modified display direction. According to various embodiments, upon detecting the input for changing the display direction, the electronic device may determine to change the display direction to a direction different from the display direction determined based on the user profile. For example, after determining to display the video content in a vertical direction, the electronic device may determine to change the display direction to a horizontal direction again since the input for changing the display direction is detected. In addition, until a next tilt change is detected, the electronic device may display a variety of content in the modified display direction. According to various embodiments, when the electronic device determines to modify the display direction, related usage information may be added to the user profile as new data and may be utilized for modeling to determine the display direction.

When the input for changing the display direction is not detected, in step 507, the electronic device displays the content while maintaining the display direction. According to various embodiments, when the input for changing the display direction is not detected, the electronic device may determine to maintain the same direction as the display direction determined based on the user profile. For example, after determining to display the video content in the horizontal direction, the electronic device may determine to maintain the display direction to the horizontal direction by detecting a touch input or the like. In addition, until a next tilt change is detected, the electronic device may display a variety of content while maintaining the display direction.

According to various embodiments, in step 503, various inputs may be detected by the sensor. In an embodiment, after determining the display direction, an input which causes a tilt change greater than a pre-set value may be detected by rotating the electronic device in one direction within a specific period of time. For example, acceleration and gravity greater than a pre-set value may be measured by an accelerometer, or an angle change greater than a pre-set value may be measured by a gyroscope. In this case, the electronic device may determine that the input for changing the determined display direction has been detected. In another embodiment, after determining the display direction, an input for moving the electronic device in opposite directions two or more times within a specific period of time may be detected. In this case, the electronic device may determine that the input for changing the determined display direction has been detected. In another embodiment, when an input for selecting content, an application, or the like, such as a touch input for the electronic device, is detected within a specific period of time after determining the display direction, the electronic device may determine that it is not the input for changing the display direction. The user input for determining whether to modify the display direction is not limited to the aforementioned embodiments, and may be changed variously.

As described above, data stored in the user profile may be used to determine the display direction. According to various embodiments, a usage time, an application in use, data obtained from the sensor, a media type, information on the display direction, or the like may be stored in the user profile. In addition, the storing of the information may be performed in background while the user uses the electronic device. An example of data stored in the user profile is as shown in Table 1 below.

TABLE 1

| Usage Time | Application | Type of Content | Start/End Time Stamp | Accelerometer | Gyroscope | Display Mode |
|---|---|---|---|---|---|---|
| 20 sec | A | Video | 1528700000, 1528700100 | X = ..., Y = ..., Z = ... | X = ..., Y = ..., Z = ... | Horizontal |
| 1 sec | A | Video | 1528700100, 1528700210 | X = ..., Y = ..., Z = ... | X = ..., Y = ..., Z = ... | Vertical |
| 20 sec | A | Image | 1528700210, 1528700410 | X = ..., Y = ..., Z = ... | X = ..., Y = ..., Z = ... | Horizontal |
| 20 sec | B | Image | 1528700410, ... | X = ..., Y = ..., Z = ... | X = ..., Y = ..., Z = ... | Vertical |

Referring to Table 1, the user profile may be configured by storing, for each row, a type of an application in use, a usage time of the application, a type of content displayed on a screen, a display mode of the content, and data obtained by the sensor. According to various embodiments, the data obtained by the sensor may include data which summarizes data sensed by at least one of an accelerometer and a gyroscope. In this case, the summarized data may include at least one of a maximum value, a minimum value, and a standard deviation in x-, y-, and z-axes among values detected by a sensor such as the accelerometer and the gyroscope. In addition, according to various embodiments, the type of content may include content such as documents, videos, and images. For convenience of explanation, a format of the user profile is specified in the form of a table, but this is for exemplary purposes, and the format of the user profile may be variously changed according to various embodiments.

In addition, as described in FIG. 5, if the display direction determined by the electronic device does not properly reflect a user's intention, the electronic device modifies the display direction. In this case, the user profile may be updated by newly adding data related to the modified display direction. Hereinafter, an embodiment in which the user profile is updated will be described with reference to FIG. 6.

Figure 6:
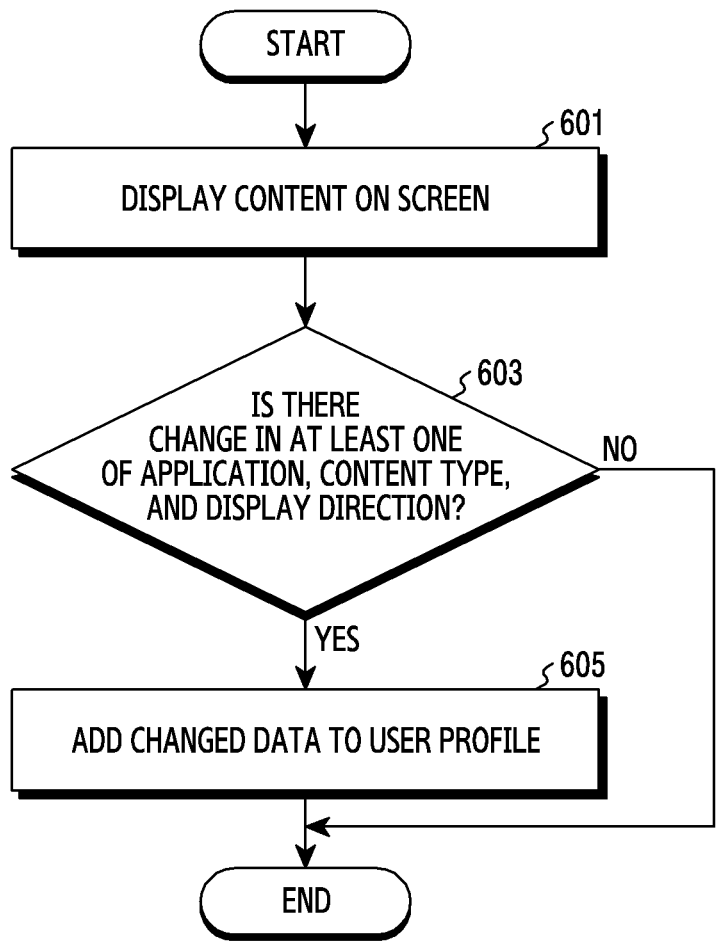
FIG. 6 is a flowchart for updating a user profile in an electronic device according to various embodiments of the disclosure.

FIG. 6 is a flowchart for updating a user profile in an electronic device according to various embodiments of the disclosure. An operation of the electronic device 100 is illustrated in FIG. 6.

Referring to FIG. 6, in step 601, the electronic device displays content on a screen. The electronic device may display, on the screen, various types of content such as documents, videos, and images provided by applications stored in the electronic device. According to various embodiments, the electronic device may display the content in a display direction determined based on a detection result of a sensor, before determining whether to change the display direction. Alternatively, the electronic device may display the content on the screen in the display direction determined based on the user profile.

In step 603, the electronic device identifies whether at least one of an application, a content type, and a display direction is changed. According to various embodiments, the change in the application, content type, and display direction may occur when the user executes the application and directly sets the display direction to display the content, or when the electronic device determines to modify the display direction. If it is identified that none of the application, the content type, and the display direction have changed, the electronic device ends updating of the user profile.

If it is identified that at least one of the application, the content type, and the display direction is changed, in operation 605, the electronic device adds data to the user profile. According to various embodiments, usage information such as a type of an application in use, a usage time of the application, a type of content displayed on the screen, a display mode of the content, and data obtained by the sensor may be added as new data.

The update of the aforementioned profile may be described in greater detail with reference to Table 1. By setting the display mode to a horizontal mode, the user may watch video content for 20 seconds through an application A. In this case, usage pattern information may be recorded in a first row.

Thereafter, when the user changes the display mode to a vertical mode while watching the video content, the electronic device may identify that the display direction has changed. The electronic device may generate new usage pattern information, and may add generated data to a second row.

Subsequently, when the user watches the video content in the vertical mode for 1 second and then displays image content by changing the display mode to the horizontal mode again, the electronic device may identify that the content type and the display direction have changed. The electronic device may generate new usage pattern information, and may add it to a third row.

In addition, when the user watches the image content in the horizontal mode for 20 seconds and then configures the image content to be displayed in the vertical mode while executing an application B, the electronic device may identify that the application and the display direction have changed. The electronic device may add the new usage pattern information to a fourth row.

As described above, the electronic device may add new data to the user profile in order to improve accuracy of a model for determining the display direction. Although a format of the user profile is specified in FIG. 6 and Table 1, this is for exemplary purposes only, and the format of the user profile may be variously changed according to various embodiments.

Figure 7:
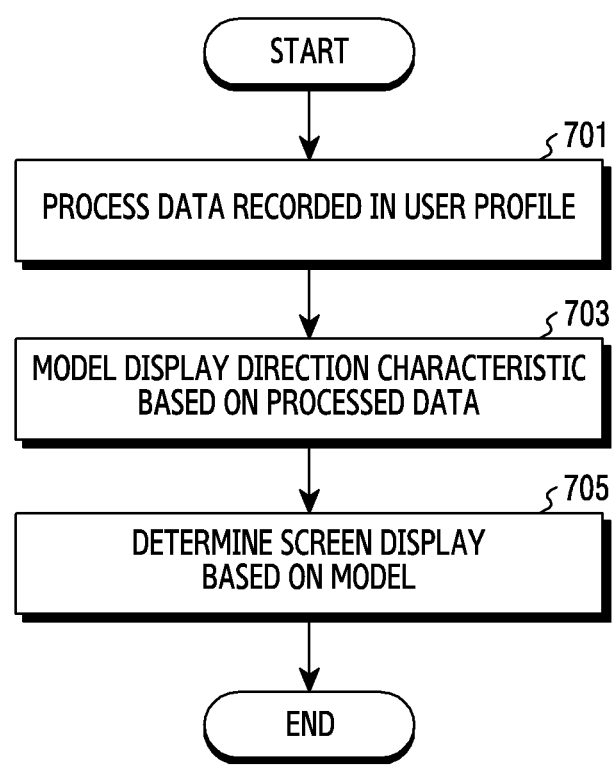
FIG. 7 illustrates an algorithm for determining a display direction of content in an electronic device according to various embodiments of the disclosure.

FIG. 7 illustrates an algorithm for determining a display direction of content in an electronic device according to various embodiments of the disclosure. An operation of the electronic device 100 is illustrated in FIG. 7. According to various embodiments, the electronic device may use an Artificial Intelligence (AI) to determine the display direction.

Referring to FIG. 7, in step 701, the electronic device processes data recorded in a user profile. For example, in a user profile created previously, data of at least one of a usage time of an application, a type of the application in use, a type of content displayed on a screen, and data obtained by a sensor may not be present for at least one timestamp in which electronic device usage information of a user is recorded. That is, if an unknown value exists in the user profile, the electronic device compensates for the unknown value. After compensating for the unknown value, the electronic device may process data by normalizing data of the user profile.

In step 703, the electronic device models a characteristic according to whether the display direction is changed based on the processed data. In this case, the electronic device may use deep leaning to model a characteristic indicated by data when the display direction is changed and a characteristic indicated by data when the display direction is maintained. More specifically, when data for at least one parameter recorded in the user profile indicates a specific value, the electronic device obtains information on a subsequent input. For example, according to values of parameters such as an application, a content type, a display direction, or the like at a specific timing, whether an input for changing the display direction is applied to the electronic device, whether the same application and content are executed without the input for changing the display direction, or whether at least one of the application and the content is changed without the input for the changing the display direction may be learned from data recorded in the user profile during a specific period of time. By collecting such information, the electronic device statistically classifies the data recorded in the user profile, thereby modeling characteristics when the display direction is changed and when the display direction is maintained. In addition, when a determination result based on the model is incorrect, the electronic device may modify the modeling of the characteristic related to the display direction change by reflecting new data, and may improve accuracy for the determining of whether to change the display direction.

In step 705, the electronic device determines the display direction on the basis of the model. As described in operation 703, the electronic device may determine whether to change the display direction on the basis of the modeling of the characteristic related to the display direction change. Accordingly, the electronic device may display the content in the determined display direction.

Although it is described above that the operation of FIG. 7 is performed by the electronic device, according to another embodiment, steps 701 and 703 may be performed by a different device. In this case, the different device may model a characteristic related to the display direction change and provide a created model to the electronic device.

In addition, according to various embodiments, the electronic device may perform training for creating and modifying a model at various frequencies. In an embodiment, the electronic device may modify the model by performing training on a real-time basis whenever the user profile is updated. In another embodiment, the electronic device may perform training every predetermined period, such as once a day or once a week.

In addition, according to various embodiments, the electronic device may use a user profile of various characteristics to perform the training for creating and modifying the model. In an embodiment, only usage pattern information created while the user uses the electronic device may be recorded in the user profile. In this case, in order to ensure high accuracy of the model, sufficient initial usage pattern information needs to be collected before the model is applied to determine the display direction.

In another embodiment, the electronic device may be pre-trained based on a user profile constructed of usage pattern information obtained from a plurality of users. In this case, a pre-created model may reflect a general usage pattern rather than a user-specific usage pattern. Thereafter, the user profile is updated when a specific user uses the electronic device to reflect usage pattern information of the specific user.

In another embodiment, the electronic device may be pre-trained based on a user profile constructed of usage pattern information obtained from a plurality of users classified according to at least one of age and gender. In this case, the electronic device may use a pre-trained model when the user sets age or gender of the user when the electronic device is initially driven. Thereafter, the user profile is updated when a specific user uses the electronic device to reflect usage pattern information of the specific user.

Embodiments for determining the display direction of content may be performed by the rotation determination unit of the electronic device. Various embodiments for implementing the rotation determination unit are described below.

In an embodiment, the rotation determination unit may be configured to predict the display direction on the basis of a sequence of events recorded in a user profile. That is, the rotation determination unit may be implemented to be trained based on an application type, a usage time, a content type, a display mode, and data obtained by a sensor, which are recorded in chronological order during the latest time T.

In another embodiment, the rotation determination unit may be configured to predict the display direction through a hierarchical structure. More specifically, the rotation determination unit may be constructed of a dedicated classifier trained for each application and one integrated classifier. In this case, the dedicated classifier is trained to determine the display direction on the basis of all data related to the use of the application, and the integrated classifier may finally determine the display direction on the basis of the determination of the dedicated classifiers.

In another embodiment, the rotation determination unit may be configured to determine the display direction on the basis of a display direction preference pre-set by the user. In this case, the electronic device may provide a User Interface (UI) which enables the user to set a ratio of the display direction for each application. FIG. 8 illustrates an example in which the rotation determination unit uses the display direction preference of the user. Referring to FIG. 8, when using an application A, the user may set the display direction preference to 0.2. In this case, a content type may not be considered to determine the display direction, and the electronic device may determine a display mode to a horizontal mode with a high ratio while the application A is running. In addition, the display direction preference may be automatically updated based on data stored in the user profile.

Figure 9A:
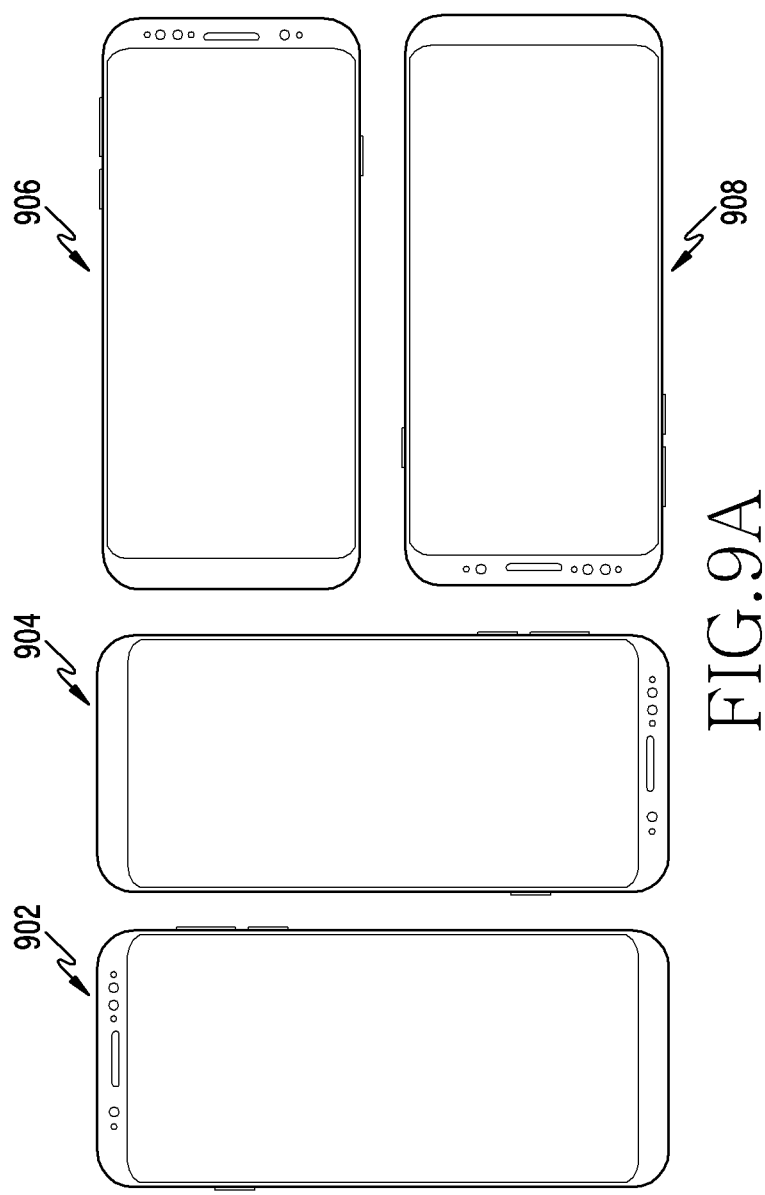
FIG. 9A illustrates an example of a display mode in an electronic device according to various embodiments.

FIG. 9A illustrates an example of a display mode in an electronic device according to various embodiments.

Referring to FIG. 9A, display modes 902 and 904 may be referred to as a vertical direction or a vertical mode. In addition, display modes 906 and 908 may be referred to as a horizontal direction or a horizontal mode. According to various embodiments, upon detecting a tilt change of the electronic device, the electronic device may determine whether to change from the display modes 902 and 904 to the display modes 906 and 908, or whether to change from the display modes 906 and 908 to the display modes 902 and 904.

Figure 9B:
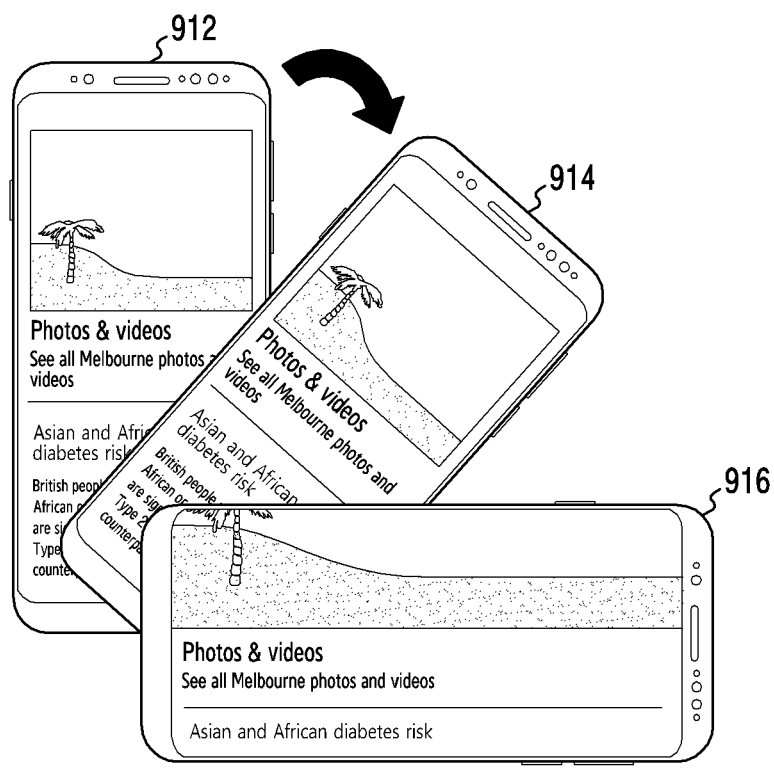
FIG. 9B illustrates an example of changing a display direction of content in an electronic device according to various embodiments.

FIG. 9B illustrates an example of changing a display direction of content in an electronic device according to various embodiments.

Referring to FIG. 9B, the electronic device determines the display direction to the vertical direction on the basis of a sensor detection result. Accordingly, the electronic device may display news in the vertical direction (912). Thereafter, the tilt change of the electronic device may be detected by the sensor by various causes such as a change in a posture of a user who holds the electronic device, a rotation applied to the electronic device with intent to change the display direction, an input applied to the electronic device during moving the electronic device to a place in a location different from a current location. When an algorithm for determining the display direction according to various embodiments is not applied, the electronic device changes the display direction to the horizontal direction when the tilt change occurs. However, according to various embodiments, the electronic device may not determine to change the display direction to the horizontal direction by considering only the tilt change. That is, the electronic device may predict whether the tilt change is for changing the display direction, based on a model created based on a user profile. When it is determined that there is no need to change the display direction, the electronic device may display the news on the screen while maintaining the display direction to the vertical direction (914). Thereafter, when a user rotates the electronic device completely in the horizontal direction, the electronic device may determine that the tilt change is for changing the display direction, and may change the display direction to the horizontal direction (916).

Figure 10A:
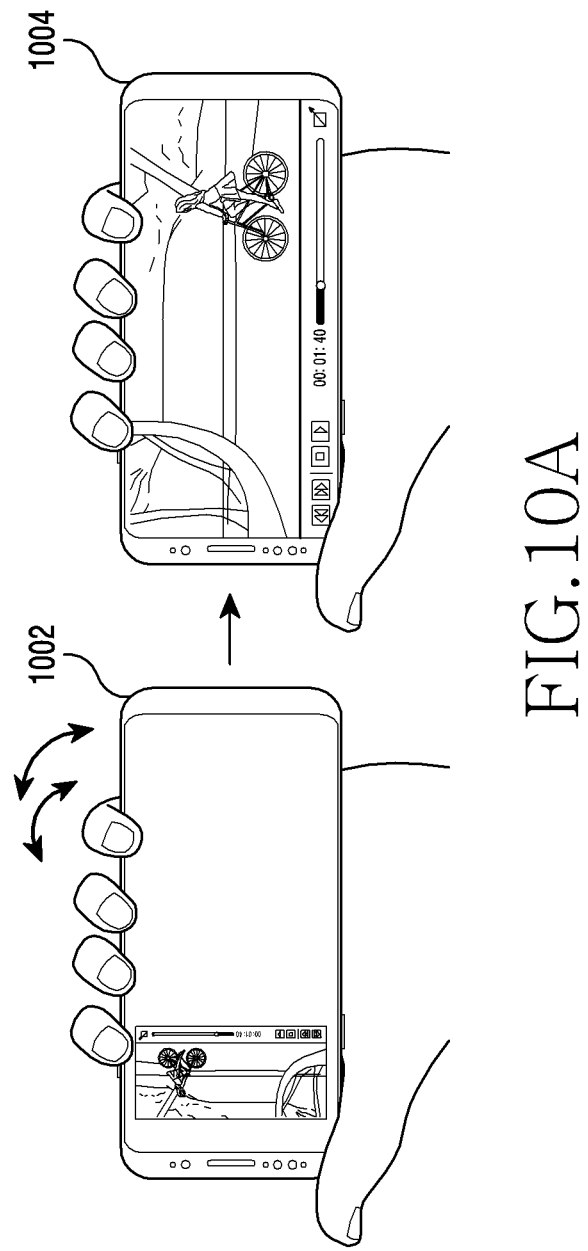
FIG. 10A and FIG. 10B illustrate an example of modifying a display direction of content in an electronic device according to various embodiments.
Figure 10B:
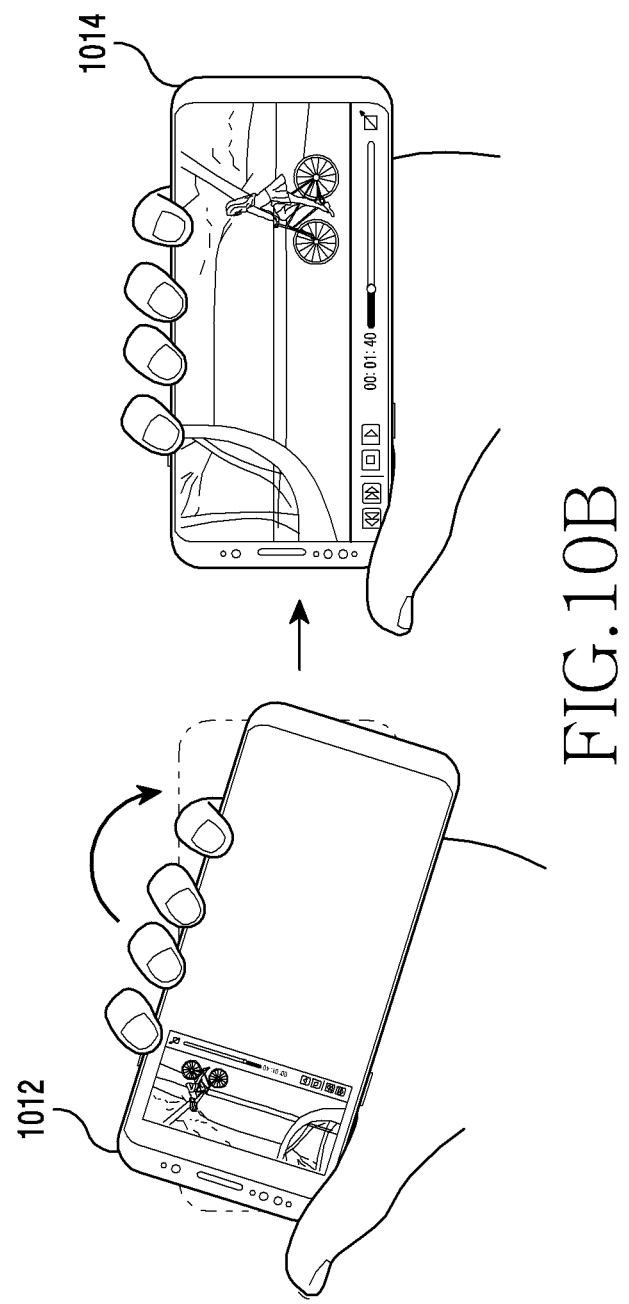

FIG. 10A and FIG. 10B illustrate examples of modifying a display direction of content in an electronic device according to various embodiments. An operation of the electronic device 100 is illustrated in FIG. 10A and FIG. 10B.

Referring to FIG. 10A, the electronic device may display video content on a screen in a vertical direction on the basis of a user profile (1002). According to various embodiments, the electronic device determines the display direction and then monitors a user input during a specific period of time. In this case, an input for moving the electronic device in opposite directions two or more times within a specific period of time, that is, an input for shaking the electronic device, may be detected. The electronic device may determine the display direction as an input for modifying the display direction to a direction different from the currently determined direction, modify the display direction to a horizontal direction, and display the video content on the screen (1004).

Referring to FIG. 10B, the electronic device may display video content on a screen in a vertical direction on the basis of the user profile (1012). According to various embodiments, the electronic device determines the display direction and then monitors a user input during a specific period of time. In this case, an input which causes a tilt change greater than a pre-set value for the electronic device within a specific period of time, that is, an input which rotates the electronic device in one direction, may be detected. The electronic device may determine the display direction as an input for modifying the display direction to a direction different from the currently determined direction, modify the display direction to the horizontal direction, and display the video content on the screen (1014).

Figure 11:
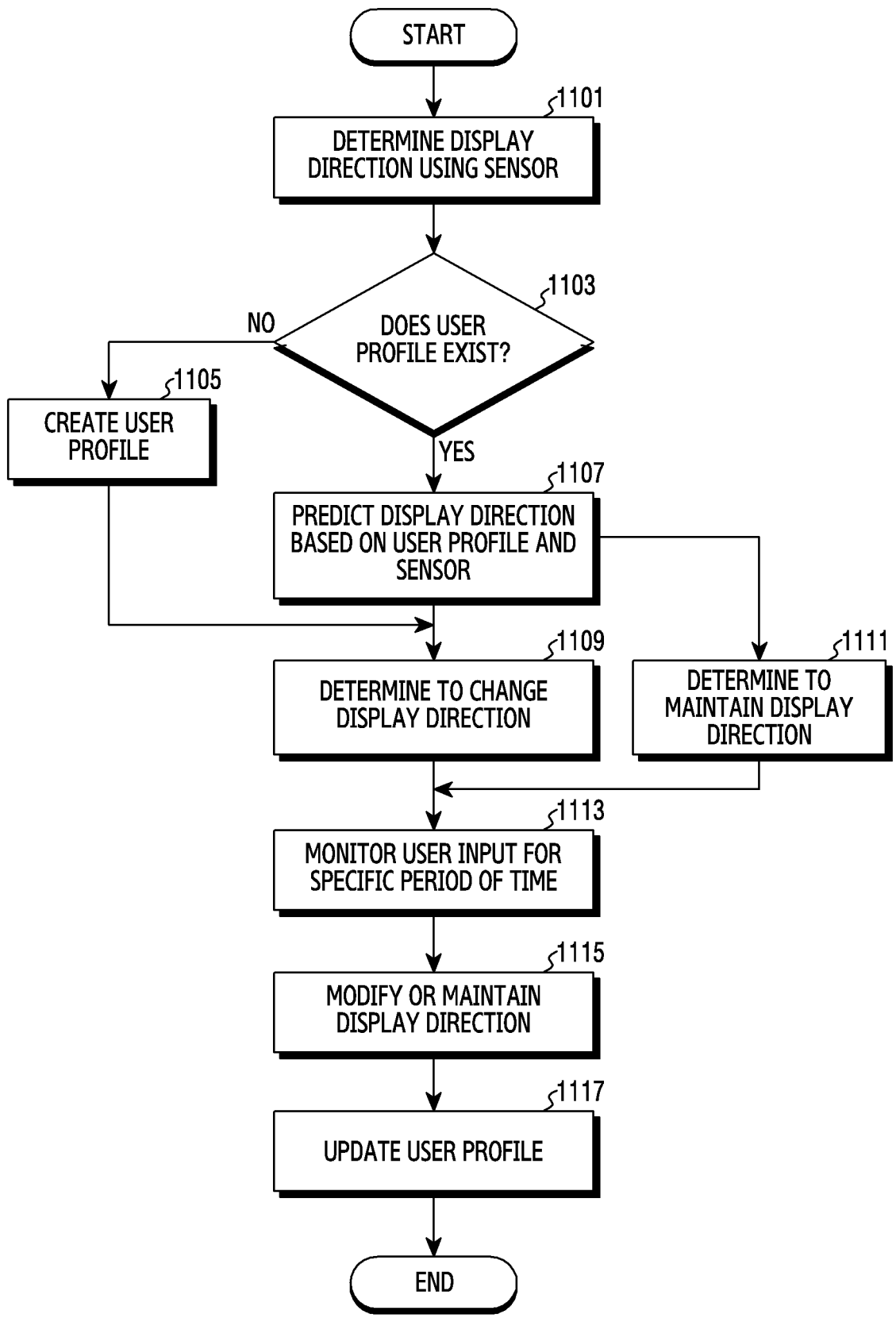
FIG. 11 is an overall flowchart for controlling a display direction of content in an electronic device according to various embodiments.

FIG. 11 is an overall flowchart for controlling a display direction of content in an electronic device according to various embodiments. An operation of the electronic device 100 is illustrated in FIG. 11.

Referring to FIG. 11, in step 1101, the electronic device determines the display direction by using a sensor. According to various embodiments, the electronic device may determine the display direction on the basis of a result detected by sensors such as a gyroscope and an accelerometer. In this case, the electronic device may display various types of content such as documents, videos, images, or the like on the screen in the determined display direction. For example, when a user rotates the electronic device such that the display direction is a horizontal direction to watch video content, the electronic device may detect that the electronic device is rotated in the horizontal direction through the sensor, and may determine to display the video content in the horizontal direction.

In step 1103, the electronic device identifies whether a user profile exists. That is, the electronic device may identify whether there is a user profile used to create and train a model for determining the display direction. More specifically, when the user profile is created based on usage pattern information of only a specific user, the user profile may not exist when the electronic device is initially driven. Alternatively, when the electronic device is pre-trained by using a user profile based on usage pattern information obtained from a plurality of users, the user profile may also exist when the electronic device is initially driven.

If it is identified that the user profile does not exist, in operation 1105, the electronic device creates the user profile. More specifically, the electronic device may store the display direction determined based on the sensor in operation 1101 and usage information at a timing for determination as initial data of the user profile. That is, after a specific user starts to use the electronic device, it may be stored as initial data of the user profile which reflects only usage pattern information of the specific user.

If it is identified that the user profile exists, in step 1107, the electronic device predicts the display direction on the basis of the user profile and the sensor. More specifically, while providing the content displayed on the screen in the determined display direction, the electronic device may detect a tilt change by using an accelerometer or a gyroscope, or may detect the tilt change by using a combination thereof. Subsequently, the electronic device predicts the display direction on the basis of the user profile. According to various embodiments, the electronic device may obtain a sensor detection result and usage information (e.g., an application to be executed, a content type, a display direction, etc.), and may determine the display direction by applying an algorithm for determining the display direction.

If the display direction determined in step 1101 is different from the display direction predicted in step 1107, the electronic device may determine to change the display direction in step 1109. More specifically, the electronic device may determine that the display direction predicted by the model based on the user profile is different from the display direction determined based on the sensor in an initial operation or the display direction determined based on the model before the tilt change is detected. In this case, the electronic device determines that there is a need to change the display direction, and displays the content in the changed display direction.

If the display direction determined in step 1101 is identical to the display direction predicted in step 1107, the electronic device determines to maintain the display direction in step 1111. More specifically, the electronic device may determine that the display direction predicted by the model based on the user profile is identical to the display direction determined based on the sensor in an initial operation or the display direction determined based on the model before the tilt change is detected. In this case, the electronic device determines that there is no need to change the display direction, and displays the content while maintaining the display direction.

In step 1113, the electronic device monitors a user input for a specific period of time. More specifically, after determining the display direction by using a model trained based on the user profile, the electronic device may monitor whether the user input occurs in response to the determined display direction. In this case, the electronic device may monitor whether the user input is detected by using a sensor. According to various embodiments, a monitoring time may be pre-set when the electronic device is initially driven, or may be adaptively changed by the electronic device.

In step 1115, the electronic device determines to modify or maintain the display direction. After the content is configured to be displayed in the determined display direction, the electronic device may determine whether a subsequent input which is input within a specific period of time is for modifying the display direction. In an embodiment, upon detecting the input for changing the display direction, the electronic device displays the content depending on the modified display direction. In addition, until a next tilt change is detected, the electronic device may display a variety of content depending on the modified display direction. In another embodiment, when the input for changing the display direction is not detected, the electronic device displays the content while maintaining the display direction. In addition, until the next tilt change is detected, the electronic device may display the variety of content while maintaining the display direction.

In step 1117, the electronic device updates the user profile. More specifically, in step 1115, when the electronic device determines to modify the display direction, related usage information may be added to the user profile as new data and may be utilized for modeling to determine the display direction. According to various embodiments, when the electronic device determines to maintain the display direction, step 1117 may be omitted.

Methods based on the embodiments disclosed in the claims and/or specification of the disclosure can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) may be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program may be stored in a memory configured in combination of all or some of these storage media. In addition, the configured memory may be plural in number.

In addition, the program may be stored in an attachable storage device capable of accessing the electronic device through a communication network such as the Internet, an Intranet, a Local Area Network (LAN), a Wide Area Network (WLAN), or a Storage Area Network (SAN) or a communication network configured by combining the networks. The storage device may have an access to a device for performing an embodiment of the disclosure via an external port. Further, an additional storage device on a communication network may have an access to the device for performing the embodiment of the disclosure.

In the aforementioned specific embodiments of the disclosure, a component included in the disclosure is expressed in a singular or plural form according to the specific embodiment proposed herein. However, the singular or plural expression is selected properly for a situation proposed for the convenience of explanation, and thus the various embodiments of the disclosure are not limited to a single or a plurality of components. Therefore, a component expressed in a plural form may also be expressed in a singular form, or vice versa.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description thereof but by the appended claims, and all differences within equivalents of the scope will be construed as being included in the disclosure.

The invention claimed is:

1. A method performed by an electronic device, the method comprising:
   displaying content on a screen of the electronic device;
   determining a display direction of content based on a consecutive data recorded during a first predetermined period of time out of data stored in a user profile upon detecting a tilt change of the electronic device by using a sensor;
   monitoring an input for modifying the determined display direction during a second predetermined period of time;
   displaying the content on the screen in a direction different from the determined display direction, upon detecting an input for modifying the determined display direction within the second predetermined period of time; and
   updating the user profile, upon detecting an input for modifying the determined display direction.

2. The method of claim 1, comprising:
   displaying of the content on the screen depending on the determined display direction; and
   identifying whether the display direction determined based on the user profile and a pre-set display direction are different from each other.

3. The method of claim 2, wherein the pre-set display direction includes a display direction determined based on the sensor when the electronic device initially operates and/or a display direction determined based on the user profile before the tilt change is detected.

4. The method of claim 1, wherein the determining of the display direction of content on the basis of the user profile comprises:

predicting display directions on a plurality of applications on the basis of the user profile; and determining a display direction corresponding to an application executed by the electronic device on the basis of the predicted display directions.

5. The method of claim 1, wherein the determining of the display direction of content on the basis of the user profile comprises:

obtaining display direction set ratios for a plurality of applications; and determining the display direction depending on the display direction set ratio updated by the user profile.

6. An electronic device comprising:

a screen;

a sensor; and at least one processor electrically coupled to the screen and the sensor, wherein the at least one processor is configured to:

display content on the screen;

determine a display direction of content based on a consecutive data recorded during a first predetermined period of time out of data stored in a user profile upon detecting a tilt change of the electronic device by using the sensor;

monitor an input for modifying the determined display direction during a second predetermined period of time;

display the content on the screen in a direction different from the determined display direction, upon detecting an input for modifying the determined display direction within the second predetermined period of time; and update the user profile, upon detecting an input for modifying the determined display direction.

7. The electronic device of claim 6, wherein the at least one processor is further configured to:

display of the content on the screen depending on the determined display direction; and identify whether the display direction determined based on the user profile and a pre-set display direction are different from each other.

8. The electronic device of claim 7, wherein the pre-set display direction includes a display direction determined based on the sensor when the electronic device initially operates and/or a display direction determined based on the user profile before the tilt change is detected.

9. The electronic device of claim 6, wherein the at least one of processor further comprises to:

predict display directions on a plurality of applications on the basis of the user profile; and determine a display direction corresponding to an application executed by the electronic device on the basis of the predicted display directions.

10. The electronic device of claim 6, wherein the at least one of processor further comprises to:

obtain display direction set ratios for a plurality of applications; and determine the display direction depending on the display direction set ratio updated by the user profile.

11. A method performed by an electronic device, the method comprising:

displaying content on a screen of the electronic device;

determining a display direction of content based on a consecutive data recorded during a predetermined period time out of data stored in a user profile upon detecting a tilt change of the electronic device by using a sensor;

displaying the content on the screen depending on the determined display direction;

wherein the user profile includes a type of an application in use, a usage time of the application, a type of the content, a display mode of the content, or data obtained by the sensor; and updating the user profile, when there is a change in at least one of the type of the application, the type of the content, and the display mode of the content.

* * * * *